UNITED STATES PATENT OFFICE.

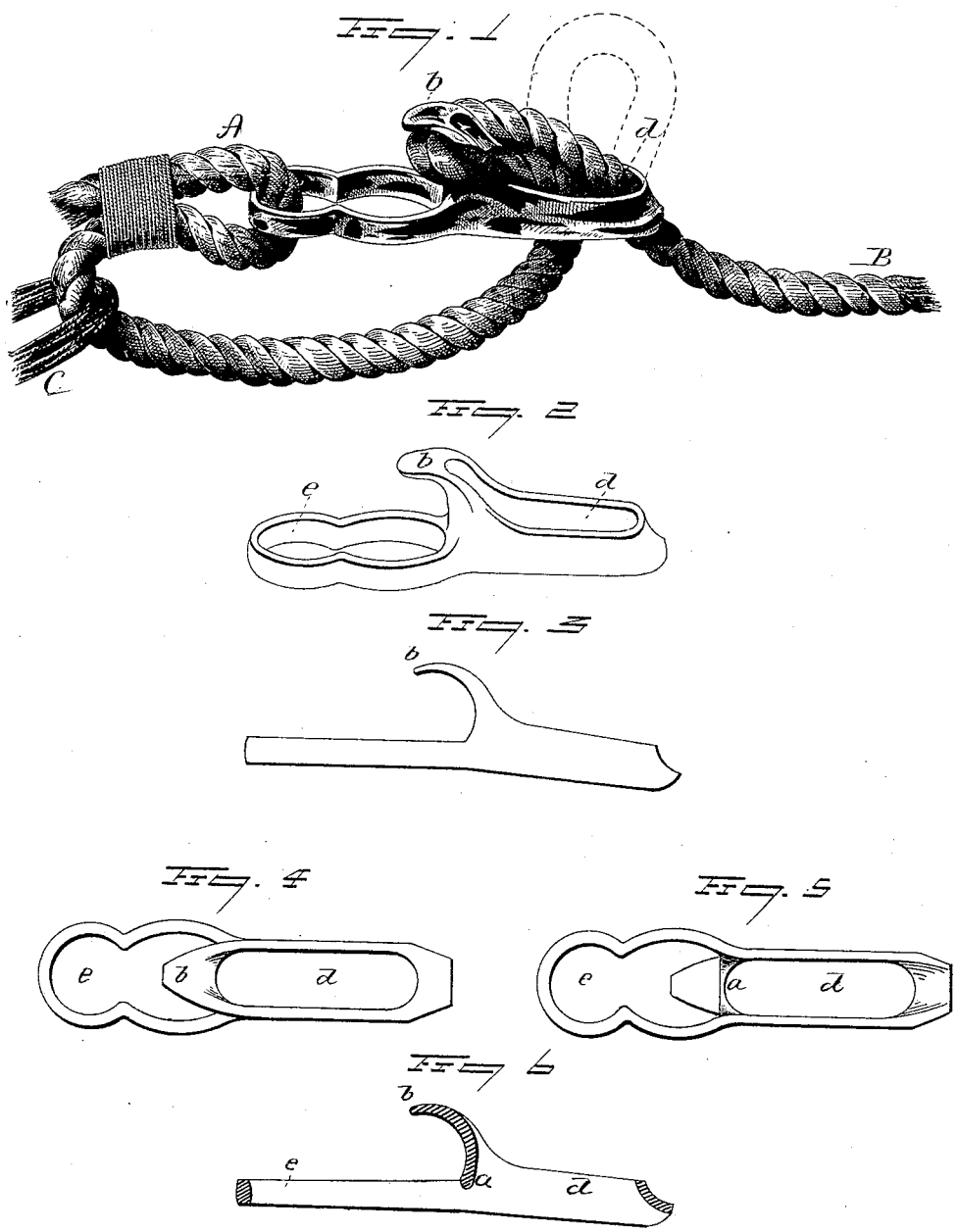

FRANK A. THOMAS, OF CEDAR RAPIDS, IOWA.

ROPE-FASTENING.

SPECIFICATION forming part of Letters Patent No. 346,390, dated July 27, 1886.

Application filed April 19, 1886. Serial No. 199,448. (No model.)

*To all whom it may concern:*

Be it known that I, FRANK A. THOMAS, of Cedar Rapids, in the county of Linn and State of Iowa, have invented a new Improvement in Rope-Fastenings; and I do hereby declare the following, when taken in connection with the accompanying drawings and the letters of reference manked thereon, to be a full, clear, and exact description of the same, and which said drawings constitute part of this specification, and represent, in—

Figure 1, a perspective view showing the fastening as applied to a hammock-rope; Fig. 2, a perspective view of the fastener; Fig. 3, a side view of the same; Fig. 4, a top view; Fig. 5, an under side view; Fig. 6, a longitudinal central section.

This invention relates to a device for supporting hammocks, the object being to make the suspension adjustable. The device, however, is applicable to rope-fastenings for other purposes; and the invention consists in the construction of the fastening device for securing the rope, as more fully hereinafter described.

The body of the fastening device is made in substantially the form of a link, and across it, about midway of its length, is a bridge, $a$, upon which is formed an open hook, $b$, opening toward one end of the body. The opening $d$ in the body in rear of the hook is in width somewhat greater than the diameter of the rope to be hitched, and at the opposite end the opening $e$ is of a shape to form an eye for conveniently securing one end of the rope.

The body and hook are cast complete, the form being such, as shown, that it may be readily molded.

The device is applied as indicated in Fig. 1. The one end, A, of the rope is secured to the eye portion $e$ of the body. The other end, B, of the rope is secured to the hammock-hook, or whatever it may be to which the hammock is to be hung. The fastening is then passed through the loop C in the end of the hammock and turned backward toward the suspending-point B. At a point in the rope where the engagement is to be made the rope is doubled and passed upward through the opening $d$ back of the hook $b$, as indicated in broken lines, Fig. 1, and the loop thus formed in the rope is turned forward and placed over the hook $b$, as seen in Fig. 1, and the hitch is secure. If at any time it is desired to disengage the hammock, the rope is slackened and the loop removed from the hook $b$. At any time when readjustment is desired it is only necessary to disengage the hitch and apply it at another point nearer to or farther from the hammock, as the case may be. The friction of the rope in the short bends, which are necessarily made in engaging the loop with the hook, is sufficient to prevent possible slipping or disengagement.

The illustration of the application of the hitching device to a hammock is sufficient to enable its application as a rope-fastening wherever it may be desired. My invention, therefore, while specially adapted to fasten a hammock-rope, is not to be understood as limited thereto.

I am aware that a metallic looping device has been employed for hanging a hammock, and in which the rope is interlaced; but I do not claim, broadly, a device for such purpose, the essential feature of my invention being the link-shaped body with a bridge across it having a hook extending upward therefrom, and so as to leave an opening back of the hook through which a loop may be introduced to engage the hook.

I claim—

The herein-described rope-fastener, consisting of the link-shaped body constructed with a bridge, $a$, transversely across it, and with a hook, $b$, extending upward from said bridge, the opening of the hook turned toward one end of the body, and the end of the body toward which the hook is turned constructed for the fixed attachment of one end of the rope, and the body at the other end constructed with a loop, $d$, through which the doubled rope may be passed to engage the hook, substantially as described.

FRANK A. THOMAS.

Witnesses:
C. O. SMITH,
GEO. S. RUGH.